Feb. 11, 1964 C. A. FREDERICK 3,121,214
SIGNALING SYSTEM FOR INDICATING IMPROPER OPERATION
OF AN ACCELERATOR PEDAL
Filed Sept. 8, 1961 2 Sheets-Sheet 1
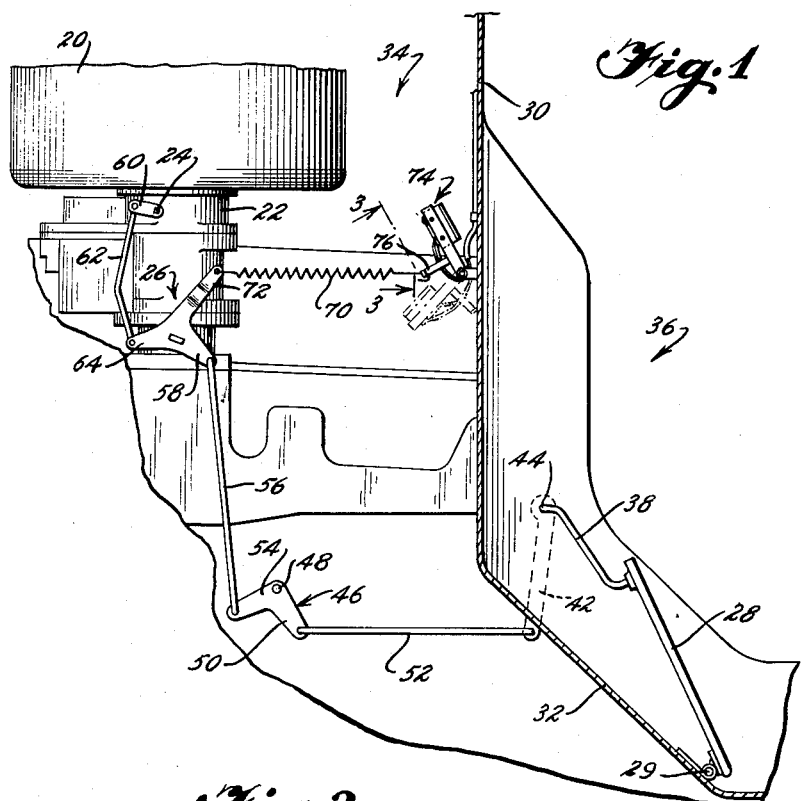
INVENTOR
Charles A. Frederick
BY James M. Drysdale
ATTORNEY Feb. 11, 1964     C. A. FREDERICK     3,121,214
SIGNALING SYSTEM FOR INDICATING IMPROPER OPERATION
OF AN ACCELERATOR PEDAL
Filed Sept. 8, 1961                2 Sheets-Sheet 2
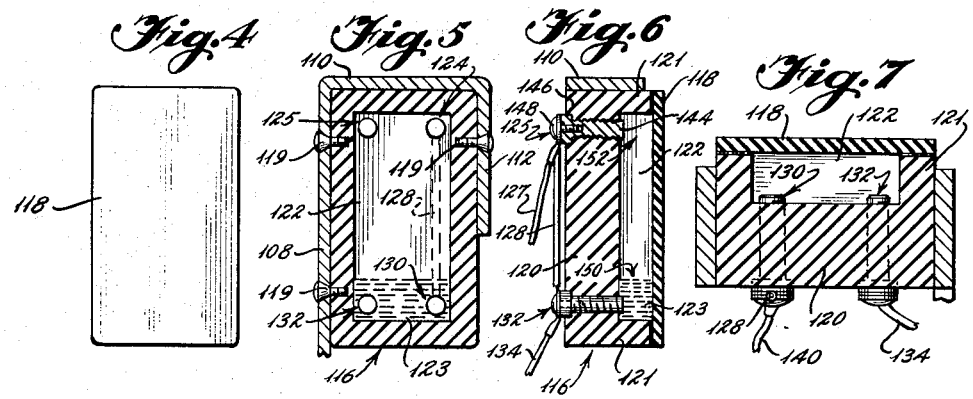
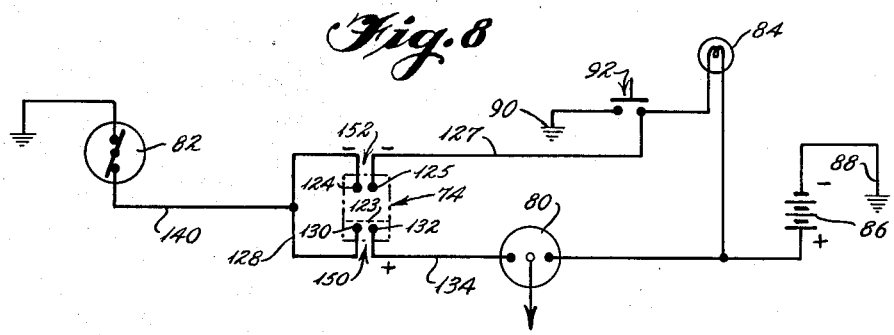
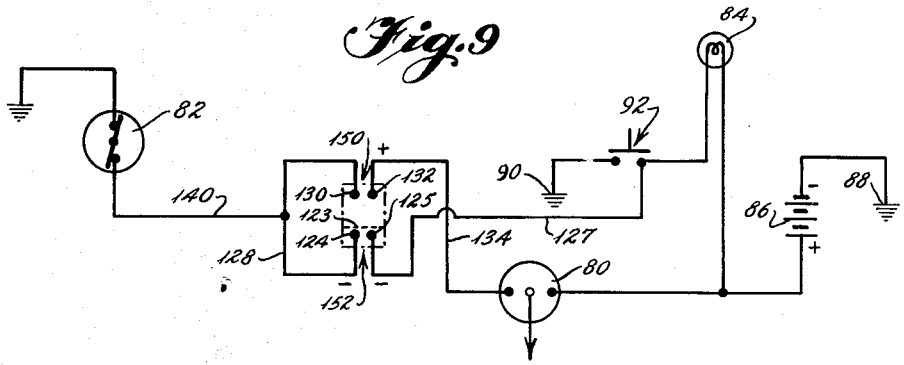
INVENTOR
*Charles A. Frederick*
BY *James M. Drysdale*
ATTORNEY

United States Patent Office 3,121,214
Patented Feb. 11, 1964

3,121,214
SIGNALING SYSTEM FOR INDICATING IMPROPER OPERATION OF AN ACCELERATOR PEDAL
Charles A. Frederick, 5522 Centre Ave., Pittsburgh 32, Pa.
Filed Sept. 8, 1961, Ser. No. 136,773
2 Claims. (Cl. 340—53)

The present invention relates to safety devices. More particularly, the present invention provides electrical safety systems for closing and/or opening appropriate electrical circuits in response to danger conditions.

Heretofore, automobile fuel supply and ignition systems have included pull back springs for returning the accelerator foot pedal to the upper position when foot pressure is removed. This spring urges the carburetor to a position where the engine is supplied minimum fuel and the engine is idling.

Property damage, personal injury and death can result when this spring breaks and the foot pedal falls to its lowest position where the maximum fuel is supplied to the engine. The engine then races and the car moves out of control. The driver, temporarily in panic, may not in sufficient time turn off the ignition switch or hook his foot under the foot pedal to prevent collision. Where this occurs in confined spaces, as in garages, the automobile can crash into a wall before the driver can control the automobile. Automobiles with automatic transmissions are particularly dangerous in this regard.

Further, damage can occur on the open highway. The automobile can collide with the rear of vehicles ahead, or cross the medial strip and collide head on with oncoming traffic.

The present invention resides in the concept of an electrical safety system for automatically opening the ignition circuit of the automobile engine when the accelerator pull back spring breaks. The invention provides a switch for automatically opening the circuit including the coil, battery, and distributor. Thus, the engine will immediately cease running.

Another feature of the invention is that it provides an automobile safety system which not only automatically interrupts the ignition electrical system upon the breaking of the pull back spring but also lights the stop lights at the rear of the automobile, to warn following motorists that the automobile is out of control and stopping.

The invention further provides an electric mercury switch pivotable between an upper and lower position for use in the aforementioned safety systems. This switch can be employed for opening and/or closing appropriate electrical circuits.

For a better understanding of the invention and its other objects, advantages and details, reference is now made to the presently preferred embodiments of the invention which are shown for purposes of illustration only, in the accompanying drawings.

FIGURE 1 is a fragmentary side elevational view of an automobile safety system according to the invention and employing a pivotable switch shown in full lines in its upper position and in dotted lines in its lower position which it assumes when the pull back spring breaks;

FIGURE 2 is a fragmentary perspective view showing the switch of FIGURE 1 in its upper or raised position;

FIGURE 3 is an elevational view taken along the line 3—3 in FIGURE 1;

FIGURE 4 is an elevational view of the inside of the cover of the switch shown in FIGURE 2;

FIGURE 5 is a transverse sectional view, through the switch, taken on the line 5—5 of FIGURE 2;

FIGURE 6 is a longitudinal sectional view taken along the line 6—6 of FIGURE 3;

FIGURE 7 is a cross sectional view on the line 7—7 of FIGURE 3;

FIGURE 8 is a schematic wiring diagram of the electrical circuit of the automobile shown in FIGURE 1 with the parts in normal operating position; and FIGURE 9 is a view similar to FIGURE 8 but showing the switch inverted from the position shown in FIGURE 8 and corresponding to the dotted line position shown in FIGURE 1 which exists when the spring breaks.

Briefly stated, the embodiment of the invention illustrated in FIGURES 1 to 9 includes an automobile carburetion and fuel control system comprising a carburetor, a carburetor control lever, linkage for turning said carburetor control lever by depressing the accelerator foot pedal, and a spring urging the carburetor to its idling position and urging the foot pedal to its uppermost position.

A mercury electrical switch has a lower portion connected to the pull back spring and is held in an upper position by the spring. The switch is pivotally mounted on a portion of the automobile body. The switch includes a cavity containing a pool of mercury. Two pairs of spaced electrical contacts are mounted in the switch. The pair of contacts closest to the pivot point of the switch are in the electrical circuit to the ignition system of the automobile. This circuit is normally closed when the switch is at its upper position.

The other pair of electrical contacts of the switch are located at a position remote from the pivot point of the switch. These contacts are in a circuit delivering power to the stop lights at the rear of the automobile.

When the spring breaks, the switch pivots by gravity from its upper position to its lower position. The automobile ignition circuit is opened so that the engine ceases to run. The driver need only apply the brakes to stop the automobile. Further, the circuit to the stop lights is closed so that the stop lights light up to warn motorists to the rear that the automobile is stopping.

If the automobile overturns, the mercury will flow to open the ignition circuit and thereby decrease danger of fire.

There now follows a specific description of the embodiment of the invention illustrated in FIGURES 1 to 9. In FIGURE 1, there is shown a portion of a standard automobile fuel supply and ignition system including an air cleaner 20, a carburetor 22, a butterfly valve 24, a carburetor throttle lever 26, an accelerator foot pedal 28 pivotal around pivot 29. A firewall 30 and an inclined floor 32 separate the engine compartment 34 from the driver compartment 36.

For operating the carburetor throttle lever 26 in response to actions on the foot pedal 28, a linkage is provided and includes a connecting link 38 having one end joined to the upper end of pedal 28 and its other end fast to a lever 42 pivotal around a pivot point 44. A bell crank lever 46 is pivotable around pin 48 and has its arm 50 connected by a link 52 to the lowermost end of lever 42. The other arm 54 of bell crank lever 46 is connected by a link 56 to arm 58 of carburetor throttle lever 26. The butterfly valve 24 is operated by a short bar 60 connected by an angled link 62 having one end secured to the bar 60 and the other end secured to the arm 64 of carburetor throttle lever 26. The accelerator foot pedal 28 is urged to its uppermost position and the carburetor is urged to engine idling position by a pull back tension spring 70 having one end connected to arm 72 of carburetor throttle lever 26. The spring 70 has its opposite end connected to an electric mercury switch 74. The spring 70, by its connection to L-shaped arm 76 of the switch 74, urges the switch 74 to pivot around spindle 78 to the uppermost position shown in full lines in FIGURES 1 and 2.

The automobile electrical circuit is partially shown in FIGURES 8 and 9 and includes an ignition coil 80, the mercury switch 74, a manually-operated ignition switch 82, a stop light 84 located at the rear of the automobile, a battery 86, ground connections 88 and 90, and a switch 92 operated by the brake foot pedal (not shown) for completing one of two circuits through the stop light 84.

The switch 74 is pivotally mounted on an L-shaped bracket 100 having an arm 102 mounted on the firewall 30 and a perpendicular arm 104 having a hole therein for receiving the spindle 78 extending into an aperture in a boss 106 formed on side plate 108 of the switch 74. The side plate 108 of the switch is integral with an end plate 110 and a side plate 112 formed in a generally J-shaped configuration partially enclosing the switch housing 114 including a box 116 and a cover 118. Screws 119 join the plates 108 and 112 to the box 116.

Referring to FIGURES 2 to 7, the switch box 116 is formed of insulator material such as plastic or wood and includes a bottom 120 and four walls 121 extending from the bottom 120 and defining a cavity 122 between the walls. Cover 118 closes the cavity 122 and is secured by adhesive to the upper surfaces of walls 121.

Four electrical contacts or electrodes are screwed through holes formed in bottom 120. Each contact has one end located in cavity 122 for making electrical contact with pool of mercury 123 contained in the cavity. The other end of each contact provides a terminal for attachment of electrical leads. Contacts 124 and 125 are located at the end of box 116 remote from or farthest away from the pivotal axis 126 of the switch 74 at spindle 78. Contact 125 is joined by lead 127 to the stop light 84, as seen in FIGURES 8 and 9. Contact 124 is electrically connected to a conductor bar 128 extending along the length of box bottom 120 and joined to contact 130 located at the end thereof closest to the pivotal axis 126 of the switch. Spaced from contact 130 is another contact 132 close to pivotal axis 126 and connected by a lead 134 to the ignition coil 80 of the automobile, as seen in FIGURES 8 and 9.

The conductor bar 128 and contacts 124 and 130 are connected by lead 140 to the ignition switch 82 of the automobile.

Contact 125, as seen in FIGURE 6, includes a screw 144 of conductor material threadedly engaging a hole in wooden box bottom 120. The outside end 146 of contact screw 144 has a threaded axial hole formed therein for receiving a terminal screw 148 for clamping electrical lead 127 in firm electrical connection with the contact screw. The other contacts are similarly constructed.

When the automobile is operating normally, with the pull back spring 70 intact, as seen in FIGURES 1, 2 and 8, the pool of mercury 123 is positioned at the end 150 of the cavity 122 closest to the pivotal axis 126. This occurs because the remote end 152 is elevated by the action of spring 70 pulling on the L-shaped arm 76 to pivot the switch 74 to its upper position. There is an open circuit between contacts 124 and 125 so that the stop light 84 is only turned on when the switch 92 is closed by operation of the brake pedal (not shown). There is a closed circuit between the contacts 130 and 132, as seen in FIGURE 8, to supply current to the coil 80 and to the distributor (not shown) for ignition of the engine.

When the pull back spring 70 breaks, gravity causes the switch 74 to fall, pivoting around the pivotal axis 126 to the lower position, shown in dotted lines in FIGURE 1 and electrically diagrammed in FIGURE 9. The mercury pool 123 falls away from the contacts 130 and 132, causing an opening of the circuit and a loss of power to the coil 80 and distributor (not shown). Thus the engine ceases running and the driver need only apply the brakes to stop the automobile.

At the same time, the mercury pool 123 falls to the remote end 152 of the cavity, as seen in FIGURE 9, and completes the circuit between contacts 124 and 125 so as to supply electrical power to the stop light 84 via the lead 127 and thereby light the lamp to warn motorists to the rear that the automobile is broken down and stopping.

Thus, the invention provides a safety system for an automobile which automatically turns off the ignition when the throttle pull back spring breaks and also automatically turns on the stop lights at the rear of the automobile.

If the automobile overturns, the mercury will fall away from contacts 130 and 132, opening the ignition circuit to coil 80 and stopping the engine. If employed only for this purpose, the switch need not be pivotally mounted.

The pivotable electric mercury switch of the invention can be applied in various other systems. While presently preferred embodiments of the invention have been illustrated and described, it will be recognized that the invention can be otherwise variously embodied and practiced within the scope of the following claims.

I claim:

1. In an automobile fuel supply and carburetion system, including a carburetor throttle lever, a spring urging said carburetor throttle lever to idling position and linkage actuatable by a foot pedal for moving said carburetor throttle lever to positions where an increased flow of fuel is delivered by the carburetor; the improvement which comprises an electric mercury switch pivotally mounted and having a portion connected to said spring, said mercury switch including a cavity containing a pool of mercury, a first pair of spaced ignition electrical contacts located at the end of said cavity near the pivot point of said switch, said ignition contacts being in the electrical ignition circuit of the automobile including the coil and battery, a second pair of spaced electrical contacts located at the opposite end of said cavity remote from said pivot point of said switch, said second pair of spaced electrical contacts being in the electrical circuit of a stop light at the rear of the automobile, said spring being connected to said switch at a lower portion of said switch adjacent said pivot point so that the tension in said spring normally pivots said switch to an upper position where said pool of mercury completes the circuit between said first pair of ignition contacts and there is an open circuit between said second pair of contacts; whereby, upon the breaking of said spring, the switch will fall by the force of gravity to a position where there is an open circuit between the first pair of ignition contacts and the pool of mercury completes the circuit between said second pair of contacts to light said stop light.

2. In an automotive vehicle fuel supply and carburetion system, including a carbureter throttle lever, a spring urging said carbureter throttle lever to idling position and linkage actuatable by a foot pedal for moving said carbureter throttle lever to positions where an increase flow of fuel is delivered by the carbureter; the improvement which comprises an electric mercury switch pivotally mounted and having a portion connected to said spring, said mercury switch including a cavity containing a pool of mercury, a pair of spaced ignition electrical contacts located at the end of said cavity near the pivot point of said switch, said ignition electrical contacts being in the electrical ignition circuit of the automotive vehicle including the coil and battery, said spring being connected to said electrical mercury switch so that the action of the spring maintains the switch in position with said end of the cavity disposed downwardly so that the pool of mercury completes the circuit between the ignition electrical contacts, the mercury switch being disposed relatively to its pivotal mounting so that upon breaking of the spring the switch falls by the force of gravity to a position with said end of the cavity disposed upwardly so that the pool of mercury is disposed out of contact with said ignition electrical contacts so that the electrical ignition circuit is open.

References Cited in the file of this patent

UNITED STATES PATENTS

| | | |
|---|---|---|
| 2,001,590 | Spiller | Mar. 14, 1935 |
| 2,580,810 | Mathis | Jan. 1, 1952 |
| 2,662,132 | Crowe et al. | Dec. 8, 1953 |
| 2,692,652 | Wilson | Oct. 26, 1954 |
| 2,782,276 | Woods | Feb. 19, 1957 |
| 2,823,367 | Huron | Feb. 11, 1958 |